(12) United States Patent
Nadolsky et al.

(10) Patent No.: US 7,314,904 B2
(45) Date of Patent: Jan. 1, 2008

(54) FUNCTIONALIZED POLYALPHAOLEFINS

(75) Inventors: Richard J. Nadolsky, Houston, TX (US); David D. Truong, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 423 days.

(21) Appl. No.: 10/852,866

(22) Filed: May 25, 2004

(65) Prior Publication Data

US 2005/0014664 A1    Jan. 20, 2005

Related U.S. Application Data

(60) Provisional application No. 60/479,316, filed on Jun. 18, 2003.

(51) Int. Cl.
*C08F 216/02*    (2006.01)
(52) U.S. Cl. .................. 526/307.5; 526/348.3; 526/227; 526/219.6; 526/317.1
(58) Field of Classification Search ............ 526/317.1, 526/307.5, 348.3, 227, 219.6
See application file for complete search history.

(56) References Cited

U.S. PATENT DOCUMENTS 2,801,984 A * 8/1957 Morgan et al. ............. 523/130
4,518,757 A * 5/1985 Schulz et al. ............... 526/329
4,714,496 A * 12/1987 Luken et al. ............... 106/270
5,160,739 A    11/1992 Kanga ........................ 424/401
5,322,633 A    6/1994 Senaratne et al. ......... 252/56 R
5,534,604 A * 7/1996 Bildhauer et al. .......... 526/253

FOREIGN PATENT DOCUMENTS

WO    WO2004/113403    12/2004

* cited by examiner

*Primary Examiner*—Ling-Sui Choi
(74) *Attorney, Agent, or Firm*—Madan, Mossman & Sriram, P.C.

(57) ABSTRACT

Disclosed is a composition of a functionalized polyalphaolefin comprising the reaction product of admixing (a) an alpha-olefin monomer having at least 10 carbon atoms; (b) an unsaturated functionalizing compound; and (c) a polymerization initializer, under reaction conditions sufficient to polymerize the alpha-olefin monomer and unsaturated functionalizing compound. Free radical initiators, especially peroxides are disclosed to be useful in preparing the functionalized polyalphaolefin. The functionalized polyalphaolefins are disclosed to be useful in preparing inks, toners, coatings, candle waxes, lubricating oils, and personal care products.

15 Claims, No Drawings

FUNCTIONALIZED POLYALPHAOLEFINS

CROSS REFERENCE TO RELATED APPLICATION

This application claims priority from the U.S. Provisional Patent Application filed on Jun. 18, 2003 having a Ser. No. 60/479,316.

BACKGROUND OF THE INVENTION

1. Field of the Invention

This invention relates to functionalized polyalphaolefins. This invention particularly relates to functionalized polyalphaolefins prepared using higher alpha olefins.

2. Background of the Art

The limited solubility of polyalphaolefins in solvents other than hydrocarbons has restricted their use in many applications, especially in coatings. For example, chlorinated polyolefins, particularly chlorinated, maleated crystalline polypropylene polymers, have very limited solubility in anything other than aromatic or chlorinated solvents. The U.S. Federal Clean Air Act of 1990 limits the amounts of solvents on the Hazardous Air Pollutants (HAPs) list that can be used in some areas, and most practical aromatic and chlorinated solvents for use in coatings applications are on the HAPs list.

One approach to overcome this problem has been to prepare functionalized polyolefins. U.S. Pat. No. 5,322,633 to Senaratne, et al., discloses that branched chain carboxylic esters can be prepared by reacting an unsaturated polyalphaolefin such as 1-decene dimer with carbon monoxide and an aliphatic alcohol solvents in the presence of an acid and a noble metal catalyst complex. The branched chain carboxylic ester can be used as a base fluid either by itself or in blends with mineral oils or other synthetic oils for use in applications including 2-stroke oils, crankcase oils, transmission fluids, compressor oils, turbine oils, hydraulic fluids, brake fluids, metalworking fluids, gear oils, greases, shock absorber fluids, heat transfer fluids, transformer oils, oil or water based drilling fluids, and the like as well as other typical applications for long chain esters such as additives for plastics, paints, coatings, elastomers, cosmetics and personal hygiene products such as soaps, lotions, color cosmetics, hair care products, creams, and antiperspirants. Processes using carbon monoxide can be dangerous and expensive. Noble metal catalysts processes can also be expensive and difficult to maintain.

Another approach to this problem has been put forth in U.S. Pat. No. 5,160,739 to Kanga. Therein, it is disclosed that a cosmetic oil and water emulsion can be prepared having as essential components a polyalphaolefin and a coupling-solubilizing agent of the formula: HO—$(CH_2CHRO)_m(CH2)_n(OCHRCH_2)_{m'}$—OH wherein m and m' are integers greater than 1, n is an integer greater than 3; and R is selected from the group consisting of hydrogen, $C_1$-$C_{12}$ alkyl and mixtures thereof. The polyalphaolefins are disclosed as having a molecular weight ranging from about 445 to about 645 daltons, and a viscosity ranging from about 4 to about 8 centistokes at 100° C. The ratio of polyalphaolefin to coupling-solubilizing agent is disclosed to range from about 100:1 to about 1:20, preferably from about 20:1 to about 1:10, optimally from about 8:1 to about 1:2. The use of second material to solubilize the polyalphaolefin can be undesirable from both a cost and handling perspective.

It would be desirable in the art of employing polyalphaolefins in the production of toners, coatings, personal care items and the like to use polyalphaolefins having inherent better compatibility relative to conventional polyalphaolefins. It would be particularly desirable in the art if such polyalphaolefins could be prepared inexpensively and without resort to processes using expensive and difficult to maintain catalyst systems.

SUMMARY OF THE INVENTION

In one aspect, the present invention is a functionalized polyalphaolefin comprising the reaction product of admixing: (a) an alpha-olefin monomer having at least 10 carbon atoms; (b) an unsaturated functionalizing compound; and (c) a polymerization initializer, under reaction conditions sufficient to polymerize the alpha-olefin monomer and unsaturated functionalizing compound.

In another aspect, the present invention is a process for preparing a functionalized polyalphaolefin comprising admixing: (a) an alpha-olefin monomer having at least 10 carbon atoms; (b) an unsaturated functionalizing compound; and (c) a polymerization initializer, under reaction conditions sufficient to polymerize the alpha-olefin monomer and unsaturated functionalizing compound.

In still another aspect, the present invention is a composition including a functionalized polyalphaolefin comprising the reaction product of admixing: (a) an alpha-olefin monomer having at least 10 carbon atoms; (b) an unsaturated functionalizing compound; and (c) a polymerization initializer, under reaction conditions sufficient to polymerize the alpha-olefin monomer and unsaturated functionalizing compound, wherein the composition is an ink, toner, coating, lubricating oil, candle wax, or a personal care product.

DETAILED DESCRIPTION OF THE PREFERRED EMBODIMENT

In one embodiment, the present invention is a functionalized polyalphaolefin comprising the reaction product of admixing an alpha-olefin monomer having at least 10 carbon atoms and an unsaturated functionalizing compound. Non-functionalized olefins that may be used with the process of the present invention include, but are not limited to, 1-decene, 1-dodecene, 1-tetradecene, 1-hexadecene, 1-octadecene, 1-eicosene, as well as such commercial mixtures sold as α-olefins including those having mainly $C_{10}$-$C_{13}$, $C_{20}$-$C_{24}$ chain lengths, $C_{24}$-$C_{28}$ chain lengths and $C_{30}$ and higher chain lengths. Examples of commercial alpha olefin admixtures useful with the present invention include ALPHA OLEFIN 30+ from Chevron Phillips and Alpha Olefin Fraction C30+ from Gulf.

The unsaturated functionalizing compounds useful with the present invention include, but are not limited to, carboxylic acids, carboxylic acid esters, amides, ethers, amines, phosphate esters, silanes and alcohols. Examples of such carboxylic acids include, but are not limited to, 5-hexenoic acid, 6-heptenoic acid, 10-undecylenic acid, 9-decenoic acid, oleic acid, and erucic acid. Also useful are esters of these acids with linear or branched-chain alcohols having from about 1 to about 10 carbon atoms, as well as triglycerides containing olefinic unsaturation in the fatty acid portion such as tall oil, fish oils, soybean oil, linseed oil, cottonseed oil and partially hydrogenated products of such oils. Other useful materials include olefinic alcohols such as allyl alcohol, 9-decen-1-ol, 10-undecylenyl alcohol, oleyl alcohol, erucyl alcohol, acetic acid or formic acid esters of these alcohols, $C_1$-$C_4$ alkyl ether derivatives of these alcohols and formamides or acetamides of unsaturated amines such as oleylamine, erucylamine, 10-undecylenylamine and allylamine. Also useful are the amines themselves. Oleylamine, erucylamine, 10-undecylenylamine and allylamine are useful with the present invention. Both the primary amines and the N,N-dialkyl tertiary amine derivatives can be used with the present invention.

In the practice of the present invention, the functionalizing compound is incorporated into the backbone or side chains of the polyolefin being produced. The molar ratio of alpha olefin monomer to unsaturated functionalizing compound useful with the present invention is from about 20:1 to 1:20. Preferably, the molar ratio of alpha olefin monomer to unsaturated functionalizing compound useful with the present invention is from about 10:1 to 1:10. Most preferably the molar ratio of alpha olefin monomer to unsaturated functionalizing compound useful with the present invention is from about 8:1 to 1:2.

In the practice of the process of the present invention, an initializing compound is used to prepare the functionalized polyalphaolefin. Preferably this initializing compound is a free radical initiator. In a preferred embodiment, the initializer is an organic peroxide. Organic peroxides that may be used with the process of the present invention include, but are not limited to, dibenzoyl peroxide, tert-amylperoxy 2-ethylhexanoate, tert butylperoxy 2-ethylhexanoate, tert-butylperoxy isobutyrate, and tert-butylperoxy isopropyl carbonate, tert-butylperoxy 3,5,5-trimethylhexanoate, 2,5-dimethyl-2,5-di(benzoyl peroxy)hexane, tert-butylperoxy acetate, tert-butylperoxy benzoate, n-butyl4,4-di(tert-butylperoxy)valerate, dicumyl peroxide, tert-butylcumyl peroxide, di(2-tert-butylperoxy isopropyl)benzene, 2,5-dimethyl-2,5-di(tert-butyl peroxy)hexane, di(tert-butyl)peroxide, 2,5-dimethyl-2,5-di(tert-butyl peroxy)-3-hexyne, tert-butyl hydroperoxide, cumyl hydroperoxide, and mixtures thereof.

Other free radical intiators can also be used with the process of the present invention. For examples, azo compounds can be used with the present invention. Azo compounds useful as free radical initiators include, but are not limited to, 2,2'-azobisisopropionitrile, 2,2'-azobisisobutyronitrile (AIBN), dimethyl azoisobutyrate, 1,1'azobis(cyclohexanecarbonitrile), 20 2,2'-azobis(2-methylpropane), and mixtures thereof.

In practicing the process of the present invention, it should be noted that with alcohols it has been found that larger amounts of initiator are required than with, for example acids or esters, and that some hydroxyl functionality is lost during polymerization. With amines, this effect can be even more pronounced. So, in a preferred embodiment of the process of the present invention acetylation of the alcohol or amine prior to the polymerization reaction can be used to overcome this problem. Subsequently, the free alcohol or amine groups in the resulting polymer can be regenerated by deacetylation.

In an alternative embodiment of the present invention, amine salts can be used. Preferably, the salt is prepared using a hydrohalide acid. Suitable acids include HCl, HBr, and HI. The amine salts are a preferred embodiment because it is easy to regenerate the free amine in the product by simply adding a base.

After the polymerization, the functionalized polyalphaolefins of the present invention have a molecular weight, determined using gel permeation chromatography procedure and a polystyrene standard of from about 200 daltons to about 150,000 daltons. Preferably, the functionalized polyalphaolefins of the present invention have a molecular weight of from about 400 daltons to about 80,000 daltons. Most preferably, the functionalized polyalphaolefins of the present invention have a molecular weight of from about 600 daltons to about 6,000 daltons.

The admixture of an alpha-olefin monomer having at least 10 carbon atoms; an unsaturated functionalizing compound; and a polymerization initializer, are combined under reaction conditions sufficient to polymerize the alpha-olefin monomer and unsaturated functionalizing compound. Alternatively, the initializer may be added in increments to the reactants over the course of the reaction, or one of the reactants may be added, in whole or in part, incrementally along with the initializer. Preferably, the process used is economical using the least amount of energy and equipment practicable. In one embodiment, the reactants and initializer are combined in a reactor and, under a nitrogen pad, allowed to react at a temperature of 150° C. Any such method can be used with the process of the present invention.

The functionalized polyalphaolefins of the present invention, when compared to unfunctionalized polyalphaolefins of similar molecular weight, generally can be somewhat more viscous. It is believed that the viscosity increases as the number of functional groups increase. The unfunctionalized polyalphaolefins are typically insoluble in non-hydrocarbon polar solvents, whereas the introduction of functionality into the functionalized polyalphaolefins of the present invention greatly improves solubility in many polar organic solvents or combinations of such solvents.

Another feature of the acid or amine functionalized polyolefins of the present invention is that they can readily be dispersed in water by combining them with; for an acid, a suitable amine or other alkaline material; or for an amine, a suitable acid or other acidic material; without the addition of a separate emulsifier. With the basic functionalities of alcohol, acid and amine available, a host of other derivatives may be prepared such as alkoxylates, esters, salts, and amides by processes well known to those of ordinary skill in the art of preparing such derivatives.

The functionalized polyalphaolefins of the present invention are useful in a great many applications and end uses. For example, they can be used in the area of inks and coatings. In inks and coatings, there has been a shift from traditional aromatic hydrocarbon solvents to polar organic solvents indicating compatibility of the functionalized polyolefins of this invention in such systems. In these systems, the functionalized polyalphaolefins of the present invention can be used to provide leveling, flow improvement and broad compatibility with various substrates including metals, cellulose-based, polyolefin, polyester, polyamide and thermoplastic polyolefins, as well as improving such surface properties of the coatings as scratch, mar and water resistance.

Another use of the functionalized polyalphaolefins of the present invention is in powder coatings, where they can providing leveling, flow, and compatibility as well. The functionalized polyolefins can be used as dispersants for pigments in both aqueous and organic solvent systems. One preferred embodiment is the use of the polymers of the present invention in color cosmetics, toners, inks, coatings and plastics, as well as in candles for improving the dispersion or encapsulation of colorants and fragrances.

As additives to plastics, the functionalized polyalphaolefins of the present invention, particularly hydrophilically modified derivatives, can provide improved lubricity, slip and antistatic properties. In addition, these materials may promote adhesion of dissimilar surfaces as well as provide improvement of surface properties such as scratch and mar resistance. Lubricating oils may benefit from the basic structure of these functionalized polyolefins as well as from the presence of functional groups which are known to enhance performance under pressure. In the personal care area, the polymers of the present invention can be useful ingredients for shampoos and conditioners in providing sheen, combability and manageability. Also, in skin care and sun care products such as skin lotion and sunscreen, the functionalized polyalphaolefins of the present invention can provide waterproofing and emolliency while contributing to moisturization by inhibiting trans epidermal water loss. These same desirable properties could also extend their utility to lipsticks, lip balms, nail lacquers and antiperspirants.

In one embodiment of the present invention, the functionalized polyolefins can be used in coating applications as an additive. They are particularly preferred for use in coil coating for metal fabrication. They can be formulated to provide both leveling and flow improvement.

The alpha olefin monomers used with the process of the present invention can be selected based upon the anticipated end use of the functionalized polyalphaolefin. For example, for inks, an alpha olefin monomer having from about 10 to 16 carbons would be preferred. In a preferred embodiment, an alpha olefin monomer having from about 20 to 36 carbons would be used to prepare a polyalphaolefin useful in preparing toners for copiers and laser printers.

EXAMPLES

The following examples are provided to illustrate the present invention. The examples are not intended to limit the scope of the present invention and they should not be so interpreted. Amounts are in weight parts or weight percentages unless otherwise indicated.

Example 1

142.8 g (0.85 moles) of 1-dodecene and 62.56 g (0.34 moles) of undecylenic acid are placed in a reaction vessel equipped with an agitator, a thermometer and a nitrogen inlet. With stirring to form an admixture, the admixture is heated to and maintained at 150° C. Ten portions of di-t-butyl peroxide, 5 g each, are added at 30-minute intervals. The reaction temperature is maintained at 150° C. for an additional one hour. The reaction mixture is vacuum stripped at 150° C. for one hour under a nitrogen sparge. $C^{13}$ nuclear magnetic resonance (NMR) integrations show disappearance of olefin, but do not show any apparent changes in carbonyl content of samples before and after polymerization. A gel permeation chromatography (GPC) molecular weight determination of the pale yellow liquid shows that the molecular weight of the polymer is 696. The polymer is tested for acid number and a value of 91.3 is observed compared to the expected value of 92.7. The polymer is tested for solubility in several solvents by admixing 2 grams of polymer with 8 grams of solvent. The results are shown below in the Table.

Comparative Example 1

The process of Example 1 was repeated substantially identically except that no undecylenic acid is used in the polymerization. The GPC data plots of this sample and of the material of Example 1 are substantially the same indicating that the undecylenic acid is incorporated into the polyalphaolefin backbone and/or side chains.

Example 2

The procedure of Example 1 is repeated substantially identically except that 151.2 g (0.9 moles) of 1-dodecene and 36.8 g (0.2 moles) of undecylenic acid are reacted. For the product obtained, $C^{13}$ NMR integrations show disappearance of olefin, but do not show any apparent changes in carbonyl content of samples before and after polymerization. The molecular weight is observed to be 845. The acid value is observed to be 54.7 compared to the expected value of 59.6. The polymer is tested for solubility in several solvents by admixing 2 grams of polymer with 8 grams of solvent. The results are shown below in the Table.

Example 3

The procedure of Example 1 is repeated substantially identically except that 176.4 grams (1.05 moles) of 1-dodecene and 32.2 g (0.175 moles) of undecylenic acid are reacted. For the product obtained, $C^{13}$ NMR integrations show disappearance of olefin, but do not show any apparent changes in carbonyl content of samples before and after polymerization. The molecular weight is observed to be 872. The acid value is observed to be 42.8 compared to the expected value of 47.0. The polymer is tested for solubility in several solvents by admixing 2 grams of polymer with 8 grams of solvent. The results are shown below in the Table.

Example 4

The procedure of Example 1 is repeated substantially identically except that, 168 g (0.375 moles) of C-30+ olefin and 46 g (0.25 moles) of undecylenic acid are reacted. For the product obtained, $C^{13}$ NMR integrations show disappearance of olefin, but do not show any apparent changes in carbonyl content of samples before and after polymerization. The molecular weight is observed to be 1696. The acid value is observed to be 56.1 compared to the expected value of 65.5. The polymer is tested for solubility in several solvents by admixing 2 grams of polymer with 8 grams of solvent, then adding more solvent when needed to achieve solubility at room temperature. The results are shown below in the Table.

Example 5

The procedure of Example 1 is repeated substantially identically except that, 200.2 g (0.65 moles) of C-20-24 olefin and 201.5 g (0.65 moles) of oleyl acetate are reacted. For the product obtained, $C^{13}$ NMR integrations show disappearance of olefin, but do not show any apparent changes in carbonyl content of samples before and after polymerization. The molecular weight is observed to be 896. The polymer is tested for solubility in several solvents by admixing 2 grams of polymer with 8 grams of solvent. The results are shown below in the Table.

Example 6

200 g of the material obtained in Example 5 is placed in a reaction vessel with a bottom outlet, an agitator and a condenser, and 125 mL of 3M sodium hydroxide aqueous solution. The mixture is stirred under reflux for 12 hours. An aqueous layer is then removed. The organic layer is washed once with 100 mL of 0.1M hydrochloric acid solution and twice with de-ionized water. $C^{13}$ NMR integrations show no residual ester. The product is a translucent solid having a somewhat higher melting point than the acetate ester precursor. Its molecular weight is 898. The polymer is tested for solubility in several solvents by admixing 2 grams of polymer with 8 grams of solvent. The results are shown below in the Table.

Example 7

The procedure of Example 1 is substantially followed except that 200 g of N-acetyl oleylamine are reacted. For the product obtained, $C^{13}$ NMR integrations show disappearance of olefinic unsaturation, but do not show any apparent changes in carbonyl content of samples before and after polymerization. The molecular weight is observed to be 506. The polymer is tested for solubility in several solvents by admixing 2 grams of polymer with 8 grams of solvent. The results are shown below in the Table.

Example 8

25 g of the product from Example 1 is added to 70 g of deionized water and 5.1 g of diethylaminoethanolamine (DEAE) in a 250 ml stainless steel beaker equipped with a mechanical stirrer and immersion thermometer. The mixture is heated with stirring to about 80° C. whereupon it forms a very viscous dispersion. Deionized water is added until the mixture stirs readily. After cooling to room temperature, the net weight of the dispersion is 127 g. It consists of 19.3% solids, has a pH of 10, and viscosity of 545 centipoises.

Example 9

Example 8 is repeated substantially identically except that 25 g of product from Example 2, 72 g of deionized water, and 3 g of DEAE are used. The product has a pH of 9.8 and a viscosity of 37 centipoises.

Example 10

The procedure of Example 1 is repeated substantially identically except that, 228 g (0.5 moles) of C-30+ olefin and 154.5 g (0.5 moles) of oleylamine hydrochloride are reacted. For the product obtained, $C^{13}$ NMR integrations show disappearance of olefin, but do not show any apparent changes in amine salt content of samples before and after polymerization.

Example 11

200 g of the material obtained in Example 10 is placed in a reaction vessel with a bottom outlet, an agitator and a condenser, and 250 mL of 2M sodium hydroxide aqueous solution. The mixture is stirred under reflux for 1 hour. An aqueous layer is then removed and the molten organic layer is washed twice with de-ionized water. The dry organic material, by $C^{13}$ NMR integrations, shows amine functionality with no residual amine salt. The product molecular weight is determined to be 1676. The polymer is tested for solubility in several solvents by admixing 2 grams of polymer with 8 grams of solvent, and then adding more solvent as needed to achieve solubility at room temperature. The results are shown below in the Table. The polymer is further tested using hot solvents and has the following solubilities:

| | |
|---|---|
| Methyl Isobutyl Ketone: | Soluble at 10% |
| Butyl Acetate: | Soluble at 20% |
| Propyl Acetate: | Soluble at 5% |
| Isopropyl Alcohol: | Insoluble both hot and at room temperature |

Comparative Example II

DIAX 2770, marketed by the Baker Petrolite, is a polyalphaolefin prepared using 1-dodecene and having a molecular weight of about 1500. The polymer is tested for solubility in several solvents by admixing 2 grams of polymer with 8 grams of solvent, then adding more solvent as needed to achieve solubility at room temperature. The results are shown below in the Table.

Comparative Example III

VYBAR 103, marketed by the Baker Petrolite, is a polyalphaolefin prepared using a C 30+ alpha olefin and having a molecular weight of about 2800. The polymer is tested for solubility in several solvents by admixing 2 grams of polymer with 8 grams of solvent, then adding more solvent as needed to achieve solubility at room temperature. The results are shown below in the Table.

TABLE

Percent Soluble at Room Temperature

| | Toluene | Propyl Acetate | Methyl Isobutyl Ketone | Butyl Acetate |
|---|---|---|---|---|
| Example 1 | 20+ | 20+ | 20+ | 20+ |
| Example 2 | 20+ | 20+ | 20+ | 20+ |
| Example 3 | 20+ | 20+ | 20+ | 20+ |
| Example 4 | 20[a] | <2 | <5[c] | <5[c] |
| Example 5 | 20+ | 20 | 20 | 20 |
| Example 6 | 20+ | 20 | 20 | 20 |
| Example 7 | 20+ | 20 | 20 | 20 |
| Example 11 | 20+ | <2 | <2 | <2 |
| Comparative Example II | 20+ | <1 | <1 | <2 |
| Comparative Example III | 5[b] | <1 | <1 | <1 |

[a]Slightly hazy
[b]Hazy gel
[c]Remains dispersed

What is claimed is:

1. A functionalized polyalphaolefin comprising the reaction product of admixing:
    (a) an alpha-olefin monomer having at least 10 carbon atoms;
    (b) an unsaturated functionalizing compound; and
    (c) a polymerization initializer, under reaction conditions sufficient to polymerize the alpha-olefin monomer and the unsaturated functionalizing compound wherein the unsaturated functionalizing compound is selected from the group consisting of allyl alcohol, 9-decede-1-ol, undecylenyl alcohol, oleyl alcohol, erucyl alcohol, an amine, and mixtures thereof; and wherein the polymerization initializer is a peroxy polymerization initializer.
2. The functionalized polyalphaolefin of claim 1 wherein the alpha-olefin monomer having at least 10 carbon atoms is selected from the group consisting of 1-decene, 1-dodecene, 1-tetradecene, 1-hexadecene, 1-octadecene, 1-eicosene, and mixtures thereof.

3. The functionalized polyalphaolefin of claim 1 wherein the alpha-olefin monomer having at least 10 carbon atoms is a mixture of alpha olefin monomers having chain lengths selected from the group consisting of $C_{10}$-$C_{13}$, $C_{20}$-$C_{24}$, $C_{24}$-$C_{28}$, and $C_{30}$ and higher chain lengths.

4. The functionalized polyalphaolefin of claim 1 wherein the unsaturated functionalizing compound is oleyl alcohol.

5. The functionalized polyalphaolefin of claim 1 wherein the amine is selected from (the group consisting of oleylamine, erucylamine, 10-undecylenylamine, allylamine and mixtures thereof.

6. The functionalized polyalphaolefin of claim 1 wherein the amine is a primary amine or a N,N-dialkyl amine derivative.

7. The functionalized polyalphaolefin of claim 1 wherein the molar ratio of alpha olefin monomer to unsaturated functionalizing compound is from about 20:1 to 1:20.

8. The functionalized polyalphaolefin of claim 1 wherein the initiator is selected from the group consisting of dibenzoyl peroxide, tert-amylperoxy 2-ethylhexanoate, tert butylperoxy 2-ethylhexanoate, tert-butylperoxy isobutyrate, tert-butylperoxy isopropyl carbonate, tert-butylperoxy 3,5,5-trimethylhexanoate, 2,5-dimethyl-2,5-di(benzoyl peroxy) hexane, tert-butylperoxy acetate, tert-butylperoxy benzoate, n-butyl 4,4-di(tert-butylperoxy)valerate, dicumyl peroxide, tert-butylcumyl peroxide, di(2-tert-butylperoxy isopropyl) benzene, 2,5-dimethyl-2,5-di(tert-butyl peroxy)hexane, di(tert-butyl) peroxide, 2,5-dimethyl-2,5-di(tert-butyl peroxy)-3-hexyne, tert-butyl hydroperoxide, cumyl hydroperoxide, and mixtures thereof.

9. The functionalized polyalphaolefin of claim 8 wherein the free initiator is di(tert-butyl) peroxide or tert-butylperoxy benzoate.

10. The functionalized polyalphaolefin of claim 1 wherein the functionalized polyalphaolefin has a molecular weight of from about 200 to about 150,000 daltons.

11. The functionalized polyalphaolefin of claim 1 wherein the functionalized polyalphaolefin has a solubility in methyl isobutyl ketone of at least about 20 percent by weight.

12. A composition including a functionalized polyalphaolefin of claim 1 wherein the composition is an ink, toner, coating, candle wax, lubricating oil, cosmetic, or a personal care product.

13. The composition of claim 12 wherein the composition is a personal care product selected from the group consisting of shampoo, conditioner, skin lotion, and sunscreen.

14. The composition of claim 12 wherein the composition is a cosmetic selected form the group consisting of lipsticks, lip balms, nail lacquers and antiperspirants.

15. The composition of claim 12 wherein the composition is a toner for use in laser printers.

* * * * *